United States Patent [19]
Mizunoya et al.

[11] Patent Number: 5,731,068
[45] Date of Patent: Mar. 24, 1998

[54] MAGNETIC RECORDING MEDIUM

[75] Inventors: Hirohide Mizunoya; Noriyuki Kitaori; Osamu Yoshida, all of Tochigi, Japan

[73] Assignee: Kao Corporation, Tokyo, Japan

[21] Appl. No.: 606,353

[22] Filed: Feb. 23, 1996

[30] Foreign Application Priority Data

Feb. 24, 1995 [JP] Japan ................................ 7-037359

[51] Int. Cl.$^6$ ................................................ G11B 5/66
[52] U.S. Cl. ........................... 428/212; 428/213; 428/216; 428/336; 428/457; 428/694 TM; 428/900; 427/131
[58] Field of Search ................................ 428/212, 213, 428/216, 336, 457, 694 TM, 900; 427/131

[56] References Cited

U.S. PATENT DOCUMENTS

| | | | |
|---|---|---|---|
| 5,225,234 | 7/1993 | Takai et al. | 428/336 |
| 5,418,059 | 5/1995 | Sugita et al. | 428/332 |
| 5,453,886 | 9/1995 | Kobayashi et al. | 360/46 |
| 5,525,398 | 6/1996 | Takai et al. | 428/141 |
| 5,549,936 | 8/1996 | Tohma et al. | 427/566 |

*Primary Examiner*—Stevan A. Resan
*Attorney, Agent, or Firm*—Oblon, Spivak, McClelland, Maier & Neustadt, P.C.

[57] ABSTRACT

A magnetic recording medium is disclosed which comprises a support and formed thereover a magnetic layer having a multilayer structure comprising at least two vapor-deposited metal films each made up of columns, each vapor-deposited metal film having a degree of column curvature of 20% or lower, and any of said vapor-deposited metal films which is closer to said support having a higher degree of column curvature than any of said vapor-deposited metal films which is closer to the surface. The magnetic recording medium enables high-density recording, is excellent especially in output characteristics and C/N characteristics, and has a balance between longitudinal-direction magnetic characteristics and vertical-direction magnetic characteristics.

20 Claims, 3 Drawing Sheets

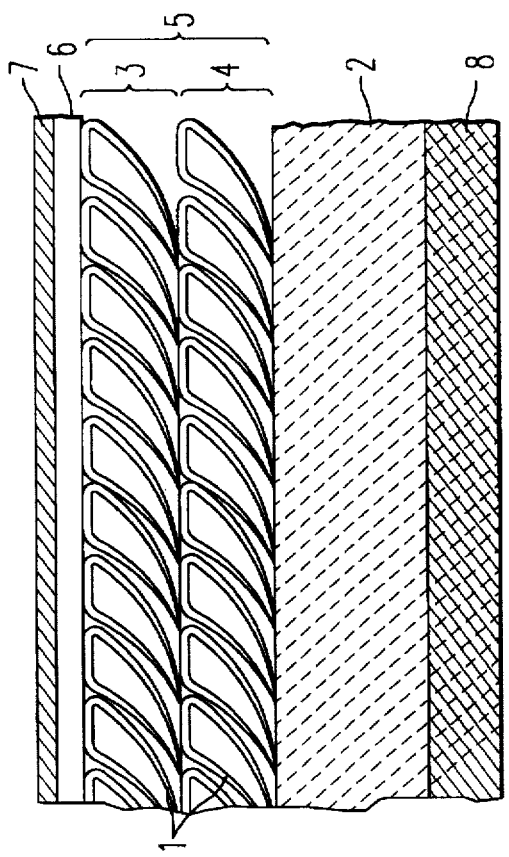
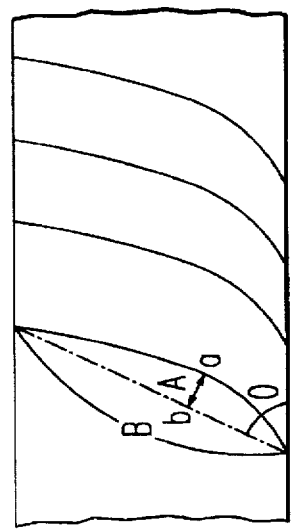

MAGNETIC RECORDING MEDIUM

FIELD OF THE INVENTION

The present invention relates to a magnetic recording medium. More particularly, this invention relates to a magnetic recording medium having an improved recording density.

BACKGROUND OF THE INVENTION

Magnetic recording media are widely used in the forms of tape, disk, drum, sheet, etc. Such magnetic recording media are usually produced either by applying a magnetic coating fluid comprising magnetic particles and a binder as major components to a nonmagnetic support such as a polyester film (hereinafter this kind of recording medium is referred to as "coating type recording medium") or by forming a thin metal film on a nonmagnetic support by a thin-film deposition technique such as vapor deposition (hereinafter this kind of recording medium is referred to as "vapor deposition type recording medium"). In recent years, magnetic recording media have come to be required not only to be miniaturized but to attain a high recording density, and various proposals have been made in order to meet such requirements.

Important points necessary for obtaining a magnetic recording medium having a high recording density are (1) to heighten output characteristics and (2) to heighten C/N characteristics.

There is the following relationship among output, residual magnetic flux density $B_r$, surface smoothness $R_z$, magnetic-layer thickness $\delta$, and coercive force $H_c$.

$$\text{Output} \propto f(B_r) - g(R_z) - h(\delta/H_c)$$

Consequently, for heightening output characteristics, it is important (a) to heighten residual magnetic flux density $B_r$, (b) to improve surface smoothness $R_z$ to reduce spacing loss, and (c) to reduce the thickness of a magnetic layer to heighten coercive force.

On the other hand, there is the following relationship between C/N characteristics and the number (n) of magnetic particles effective for magnetic recording.

$$C/N \propto n/\sqrt{n}$$

Consequently, for heightening C/N characteristics, it is important to increase the number (n) of magnetic particles effective for magnetic recording. One effective method for increasing the number (n) of magnetic particles effective for magnetic recording is to use a magnetic layer having a multilayer structure.

When coating type magnetic recording media are compared with vapor deposition type magnetic recording media in suitably for (1) heightening output characteristics and (2) heightening C/N characteristics, which are important points necessary for obtaining a high recording density, the vapor deposition type magnetic recording media are superior to the coating type magnetic recording media in all of residual magnetic flux density $B_r$, surface smoothness $R_z$, magnetic-layer thickness $\delta$, coercive force $H_c$, and the number of magnetic particles effective for magnetic recording n. That is, a vapor deposition type magnetic recording medium is more advantageously used for obtaining a magnetic recording medium having a high recording density.

In particular, since the vapor deposition type magnetic recording media have a magnetic layer made up of columnar structures, they are advantageous over the coating type magnetic recording media in that they are suitable for recording with a ring head.

Columnar structures in the magnetic layer of a vapor deposition type magnetic recording medium are described in K. Nakamura, et al., IEEE Transactions on Magnetics, Vol. Mag-18, No. 6, 1077–1079 (1982). In this reference, however, there is no description concerning a magnetic layer having a degree of column curvature not higher than a specific value.

On the other hand, with the trend toward higher recording densities, magnetic recording media have come to be required to have satisfactory magnetic characteristics not only in the longitudinal direction but in the vertical direction. However, since longitudinal-direction magnetic characteristics and vertical-direction magnetic characteristics influence each other, it is difficult to obtain satisfactory magnetic characteristics in both directions. Hence, there is a desire for a magnetic recording medium having a balance between longitudinal-direction magnetic characteristics and vertical direction magnetic characteristics.

SUMMARY OF THE INVENTION

In view of the prior art techniques described above, an object of the present invention is to provide a magnetic recording medium which enables high-density recording, is excellent especially in output characteristics and C/N characteristics, and has a balance between longitudinal-direction magnetic characteristics and vertical-direction magnetic characteristics.

As a result of intensive studies made by the present inventors, it has been found that in a vapor deposition type magnetic recording medium having a magnetic layer comprising two or more superposed vapor-deposited films, the degrees of column curvature and the thicknesses of the individual vapor-deposited films are closely related to output characteristics and C/N characteristics.

The present invention has been achieved based on the above finding. The object described above is accomplished by providing a magnetic recording medium comprising a support and formed thereover a magnetic layer having a multilayer structure comprising at least two vapor-deposited metal films each made up of columns, each vapor-deposited metal film having a degree of column curvature of 20% or lower, and any of said vapor-deposited metal films which is closer to said support having a higher degree of column curvature than any of said vapor-deposited metal films which is closer to the surface.

The above object is also accomplished according to the present invention by providing a magnetic recording medium comprising a support and formed thereover a magnetic layer having a multilayer structure comprising at least two vapor-deposited metal films each made up of columns, each vapor-deposited metal film having a degree of column curvature of 20% or lower, and any of said vapor-deposited metal films which is closer to said support having a larger thickness than any of said vapor-deposited metal films which is closer to the surface.

In magnetic recording, the amount of the magnetic flux which penetrates into a magnetic recording medium is important. In the magnetic recording medium of the present invention, the regulated shapes of the columns in the vapor-deposited metal films constituting the magnetic layer facilitate the penetration of magnetic flux especially in recording with a ring head and, as a result, output characteristics and C/N characteristics are improved.

BRIEF DESCRIPTION OF THE DRAWINGS

FIG. 1 is a view showing the state of columns in the vapor-deposited metal films constituting the magnetic layer of a magnetic recording medium according to the present invention.

FIG. 2 is an enlarged view of some of the columns shown in FIG. 1.

Figure 3:
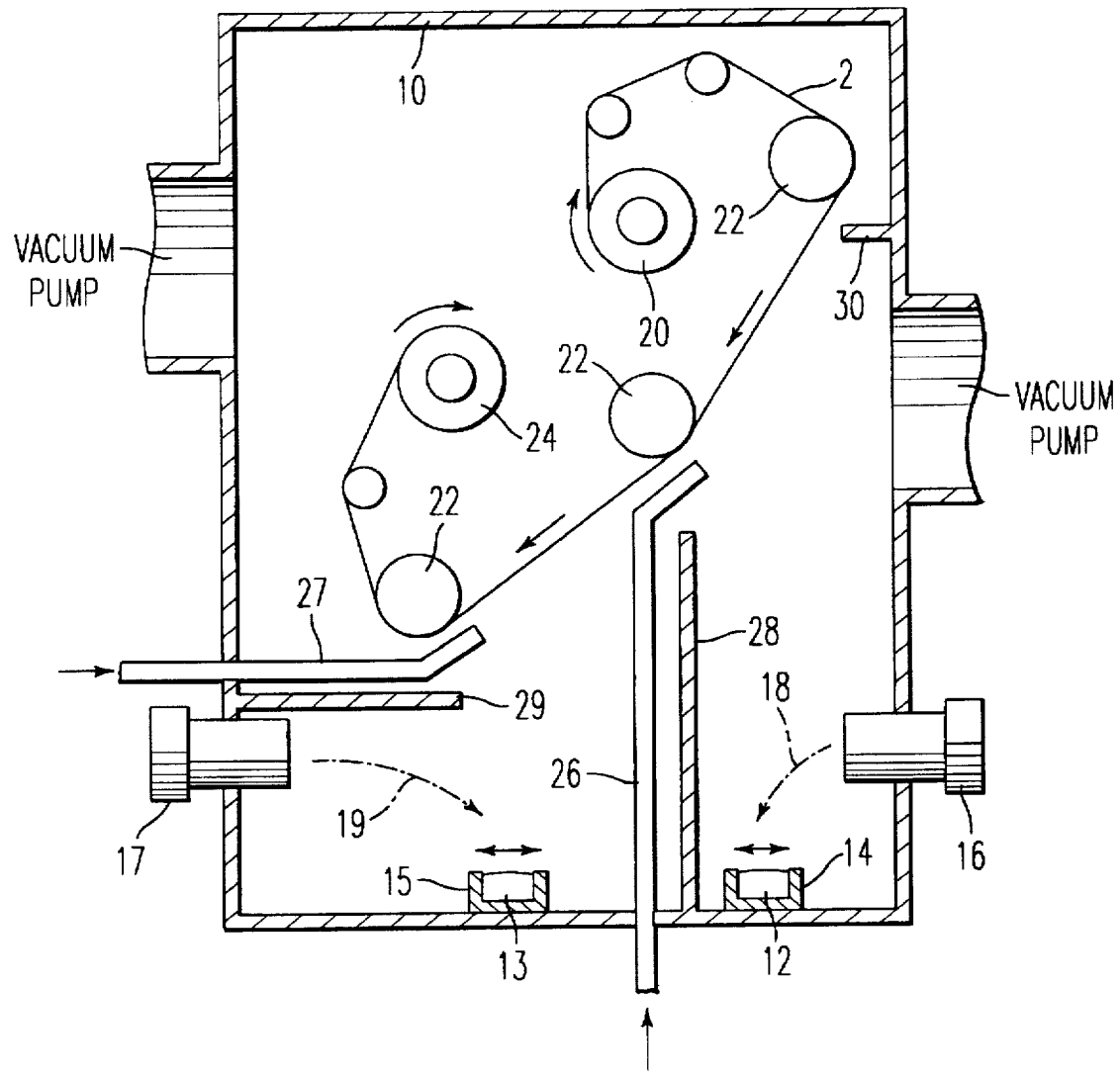
FIG. 3 is a view showing a preferred apparatus for use in producing the magnetic recording medium of the present invention.

Description of Symbols:

1 column
2 support
3, 4 vapor-deposited metal film
5 magnetic layer
6 protective layer
7 lubricant layer
8 back coat layer

DETAILED DESCRIPTION OF THE INVENTION

The magnetic recording medium of the present invention is explained below in detail.

Although the magnetic recording medium of the present invention is usable in the form of tape, disk, drum, or sheet, or in another form, an especially preferred form is a magnetic tape. In particular, the magnetic recording medium of this invention is suitable for use as a magnetic tape for recording/reproduction with a ring head.

The magnetic recording medium of the present invention comprises a support and formed thereover a magnetic layer having a multilayer structure comprising at least two vapor-deposited metal films. A known magnetic or nonmagnetic support may be used as the support without particular limitations. Examples of usable support materials include known resins such as polyethylene terephthalate, polyethylene naphthalate, polyphenylene sulfide, polycarbonates, polyamides, polyimides, polyamide imides, polysulfones, aramides, and aromatic polyamides; metals such as aluminum and copper; and paper. The support may have any shape such as, e.g., film, tape, sheet, disk, or drum. Before the magnetic layer is formed, a surface of the support may be subjected to corona discharge treatment, plasma treatment, adhesion-facilitating treatment, heat treatment, dust-removing treatment, bombarding treatment, or the like in the air and/or in a vacuum. The preferred range of the thickness of the support is from 1 to 300 µm.

The magnetic layer having a multilayer structure comprising at least two vapor-deposited metal films which layer is characteristic of the present invention is then explained by reference to FIG. 1. FIG. 1 is a view showing the state of columns in the vapor-deposited metal films constituting the magnetic layer of a magnetic recording medium according to the present invention. FIG. 2 is an enlarged view of some of the columns shown in FIG. 1.

In FIG. 1, numeral 2 denotes a support described above and 5 denotes a magnetic layer formed on the support 2. The magnetic layer 5 is composed of two vapor-deposited metal films 3 and 4, and each vapor-deposited metal film consists of columns 1. Numerals 6, 7, and 8 denote a protective layer, a lubricant layer, and a back coat layer, respectively, which are optionally formed in the magnetic recording medium of the present invention, as will be described later.

Although the magnetic layer 5 shown in FIG. 1 is composed of the two vapor-deposited metal films 3 and 4, the present invention is not limited to this embodiment. The magnetic layer is not limited in the number of its constituent layers, as long as it has a multilayer structure comprising at least two vapor-deposited metal films. If the magnetic layer consists of only one vapor-deposited metal film, high C/N characteristics cannot be obtained because the number of magnetic particles effective for magnetic recording is small.

The magnetic layer especially preferably has a multilayer structure consisting of two or three vapor-deposited metal films. A magnetic layer having four or more constituent layers is not so preferred in that not only an impaired production efficiency results, but also the individual layers should have a reduced thickness so as to give the same total thickness as in a two- or three-layer magnetic layer and this may lead to a decrease in saturation flux density ($B_S$).

Examples of materials of the vapor-deposited metal films include metals such as Fe, Co, and Ni and alloys such as Co-Ni, Co-Pt, Co-Ni-Pt, Fe-Co, Fe-Ni, Fe-Co-Ni, Fe-Co-B, Co-Ni-Fe-B, and Co-Cr. Also usable are Fe-N, Fe-N-O, Fe-C, Fe-C-O, and the like. An oxidizing gas is preferably fed during formation of the vapor-deposited metal films to form an oxide film as a protective layer on the surface of the vapor-deposited metal films. Examples of the oxidizing gas include air and oxygen gas, with the latter being preferred.

The individual vapor-deposited metal films may be made of the same material or different materials, but preferably the same material.

In the present invention, the vapor-deposited metal films are preferably formed by a physical vapor deposition technique (PVD technique) such as, e.g., vacuum deposition or sputtering. Details of such techniques for use in forming vapor-deposited metal films will be given later.

The vapor-deposited metal films each has a degree of column curvature of 20% or lower. If the vapor-deposited metal films have a degree of column curvature exceeding 20%, the penetration of magnetic flux becomes insufficient and, hence, a magnetic recording medium excellent in output characteristics and C/N characteristics cannot be obtained. The lower the degree of column curvature, the better. Specifically, the degree of column curvature is desirably 15% or lower, preferably 10% or lower. As shown in FIG. 2, the degree of curvature of a column means the value calculated using the following equation from the length (B) of the straight line extending from one end to the other end of the column and the length (A) of the straight line a–b which meets that straight line at right angles and constitutes the maximum distance between that straight line and the column.

Degree of curvature (%)=(A/B)×100

In FIG. 1 is shown as an example a magnetic layer composed of two vapor-deposited metal films. The column state shown in this figure can be observed, for example, in a TEM image of a tape-length-direction vertical section of the vapor-deposited metal films.

The degree of column curvature of any vapor-deposited metal film closer to the support is higher than that of any vapor-deposited metal film closer to the surface. Namely, the individual vapor-deposited metal films are formed in such a manner that among all the vapor-deposited metal films, the vapor-deposited metal film closest to the support has the highest degree of column curvature and any vapor-deposited metal film closer to the surface has a lower degree of column curvature, with the degree of column curvature gradually decreasing from the support to the surface. Due to this structure, signals having a short wavelength, i.e., high-frequency signals, can be recorded in a vapor-deposited metal film closer to the surface, and signals having a long wavelength, i.e., low-frequency signals, can be recorded in a vapor-deposited metal film closer to the support. As a result, frequency characteristics can be improved further.

In the magnetic layer described above, the thickness of any vapor-deposited metal film closer to the support is larger than that of any vapor-deposited metal film closer to the surface (closer to the lubricant layer 7 in FIG. 1). Namely, the individual vapor-deposited metal films are formed in such a manner that among all the vapor-deposited metal films, the vapor-deposited metal film closest to the support has the largest thickness and any vapor-deposited metal film closer to the surface has a smaller thickness, with the thickness gradually decreasing from the support to the surface. Due to this thickness gradation in the vapor-deposited metal films, well balanced properties are obtained throughout a range of from a low-frequency to a high-frequency region. In the present invention, when a thickness difference of 10% or larger is observed between two adjacent vapor-deposited metal films in the examination of a tape-length-direction vertical section of the vapor-deposited metal films with a transmission electron microscope (TEM), these vapor-deposited metal films are regarded as "there is a thickness difference." Although the vapor-deposited metal films desirably have a small thickness so as to enable the magnetic recording medium to have heightened high-frequency output characteristics, they are desirably thick in some degree so as to attain satisfactory low-frequency output characteristics. From the standpoint of a balance between high-frequency output and low-frequency output, the thickness of each vapor-deposited metal film is desirably from 500 to 2,500 Å, preferably from 600 to 1,500 Å.

The total thickness of the magnetic layer is desirably from 1,000 to 5,000 Å, preferably from 1,200 to 3,000 Å. If the total thickness thereof is smaller than 1,000 Å, there are cases where the magnetic layer has insufficient durability. If the total thickness thereof exceeds 5,000 Å, there are cases where self-demagnetization is increased disadvantageously.

In a preferred embodiment of the magnetic recording medium according to the present invention, the vapor-deposited metal films each has a degree of column curvature of 20% or lower, and any of the vapor-deposited metal films which is closer to the support has a higher degree of column curvature and a larger thickness than any of the vapor-deposited metal films which is closer to the surface. Due to this structure also, high-frequency signals can be recorded in a vapor-deposited metal film closer to the surface, and low-frequency signals can be recorded in a vapor-deposited metal film closer to the support. As a result, frequency characteristics can be improved further.

In another preferred embodiment of the magnetic recording medium according to the present invention, the degree of column curvature of a vapor-deposited metal film closer to the support (lower layer) is at least two times the degree of column curvature of a vapor-deposited metal film closer to the surface (upper layer). In the case where the vapor-deposited metal films, for example, consist of two superposed layers, the lower layer desirably has a degree of column curvature of 20% or lower (preferably from 8 to 15%) and the upper layer desirably has a degree of column curvature of 10% or lower (preferably from 5 to 10%), because this results in even more improved frequency characteristics. In the case where the vapor-deposited metal films consist of three or more superposed layers, any two adjacent vapor-deposited metal films desirably satisfy the above requirement concerning the degree of column curvature, that is, the degree of column curvature of the layer closer to the support is at least two times the degree of column curvature of the other layer.

In still another preferred embodiment of the magnetic recording medium according to the present invention, the vapor-deposited metal films each is made up of columns in which the angle formed by straight line B extending from one end to the other end of each column and the base plane (the angle of column inclination, θ) is from 20° to 80° as shown in FIG. 2. The reasons for the preference of the above range are as follows. If the angle of column inclination is smaller than 20°, output may be low in a high-frequency region, although satisfactory in a low-frequency region. If the angle of column inclination exceeds 80°, output may be low in a low-frequency region, although satisfactory in a high-frequency region. It is especially preferred that any of the vapor-deposited metal films which is closer to the support have a smaller angle of column inclination than any of the vapor-deposited metal films which is closer to the surface. Namely, the individual vapor-deposited metal films are formed in such a manner that among all the vapor-deposited metal films, the vapor-deposited metal film closest to the support has the smallest angle of column inclination and any vapor-deposited metal film closer to the surface has a larger angle of column inclination, with the angle of column inclination gradually increasing from the support to the surface. In the case where the magnetic layer is composed of two superposed vapor-deposited metal films as shown in FIG. 1, the angle of column inclination in the vapor-deposited metal film closer to the support (lower layer) is especially preferably from 35° to 60° and the angle of column inclination in the vapor-deposited metal film closer to the surface (upper layer) is especially preferably from 30° to 55°.

The magnetic layer thus formed preferably has a longitudinal-direction coercive force of from 1,000 to 2,500 Oe and a vertical-direction coercive force of from 1,500 to 3,000 Oe, besides the properties described above. As stated hereinabove, it is difficult to obtain a magnetic layer having satisfactory magnetic characteristics in both the longitudinal and vertical directions. In the present invention, however, due to the vapor-deposited metal films regulated so as to have a degree of column curvature of 20% or lower, the magnetic layer can have a balance between longitudinal-direction magnetic characteristics and vertical-direction magnetic characteristics to facilitate high-density recording. Although the above values of coercive force vary depending on the degree of column curvature, the magnetic permeability of a head, the thickness of the magnetic recording medium, etc., the above-specified ranges of coercive force in the longitudinal and vertical directions are preferred because such values of coercive force result in heightened output especially in a high-frequency region. In particular, longitudinal-direction coercive forces lower than 1,000 Oe may result in a decrease in output, while longitudinal-direction coercive forces exceeding 2,500 Oe may result in a decrease in saturation flux density or deterioration of suitability for overwriting. The especially preferred range of the longitudinal-direction coercive force of the magnetic layer is from 1,300 to 2,000 Oe, and that of the vertical-direction coercive force thereof is from 1,700 to 2,900 Oe.

Prior to formation of the magnetic layer, an undercoat layer may be formed on the support surface in order to improve adhesion of the magnetic layer. This undercoat layer, for example, consists of a coating film containing particles of $SiO_2$ or another substance and having a thickness of from 0.05 to 0.5 µm. This undercoat layer serves to impart moderate surface roughness to the support to thereby not only improve adhesion of the magnetic layer to be formed by, e.g., diagonal vapor deposition, but also regulate the magnetic layer so as to have moderate surface roughness. As a result, running properties can be improved.

As stated hereinabove, the magnetic recording medium of the present invention comprises the support and formed thereover a magnetic layer having a multilayer structure comprising at least two vapor-deposited metal films. Namely, in the magnetic recording medium of the present invention, the magnetic layer may be formed directly on the support, or any desired layer (e.g., the undercoat layer described above) may be present between the support and the magnetic layer. Further, as shown in FIG. 1, the magnetic recording medium of the present invention may have, on the magnetic layer 5, a protective layer 6 for protecting the magnetic layer and have, on the protective layer, a lubricant layer 7 for enhancing durability. These protective and lubricant layers are explained below.

The protective layer is formed by depositing a film of carbon, a carbide, or a nitride, in particular diamond-like carbon, diamond, boron carbide, silicon carbide, boron nitride, silicon nitride, silicon oxide, aluminum oxide, or the like, on the magnetic layer generally in a vacuum. Either of a chemical vapor deposition technique (CVD technique) and a PVD technique may be used for forming the protective layer. Particularly effective CVD techniques are the ECR (electron cyclotron resonance) process using microwave and the process using radio-frequency (RF) wave. In the case of forming the protective layer by a CVD technique, the feedstock used may be in any of gas, liquid, and solid states.

The protective layer is preferably made of diamond-like carbon. In the case where a gaseous feedstock is used to form a protective layer made of diamond-like carbon, the gaseous feedstock is preferably a methane/argon mixed gas, an ethane/hydrogen mixed gas, or a methane/hydrogen mixed gas. In the case where a liquid feedstock is used to form a protective layer made of diamond-like carbon, the liquid feedstock is preferably an alcohol or a saturated hydrocarbon. In the case where a solid feedstock is used to form a protective layer made of diamond-like carbon, the solid feedstock is preferably naphthalene or a higher paraffin. In this case, the solid may be heated or ultrasonic wave may be applied thereto.

Examples of the PVD technique include the thermal evaporation method, sputtering, and ion plating. Although any of such techniques is usable, sputtering is especially effective. In the case where a protective layer made of diamond-like carbon is formed by sputtering, this sputtering is preferably carried out using a graphite target in a methane/argon mixed gas or a methane/hydrogen mixed gas. In the case where a protective layer made of silicon nitride is formed by sputtering, this sputtering is preferably carried out using a silicon target in an argon/nitrogen mixed gas, an argon/ammonia mixed gas, nitrogen gas, ammonia gas, or an ammonia/monosilane ($SiH_4$) mixed gas. In the case where a protective layer made of aluminum oxide is formed by sputtering, this sputtering is preferably carried out using an aluminum target in an argon/oxygen mixed gas.

The degree of vacuum used in the formation of the protective layer is desirably about from $10^{-1}$ to $10^{-5}$ Torr for CVD techniques and about from $10^{-4}$ to $10^{-7}$ Torr for PVD techniques. Although the thickness of the protective layer is not particularly limited, it is desirably from 10 to 300 Å preferably from 30 to 150 Å.

The lubricant layer is then explained.

The lubricant layer is preferably formed by spraying a lubricant over the magnetic layer (or over the protective layer when it has been formed on the magnetic layer) with a sprayer equipped with an ultrasonic generator (hereinafter this type of sprayer being referred to as "ultrasonic sprayer"). Specifically, this ultrasonic sprayer comprises a feed means for the lubricant, an atomizing means (ultrasonic generator) for applying ultrasonic to the lubricant fed from the feed means to atomize the same, and a nozzle for spraying the atomized lubricant. A nozzle-type spraying device generally called a single-fluid nozzle may be used.

Lubricant application with an ultrasonic sprayer has an advantage that the fluorine-compound lubricants, e.g., perfluoropolyethers, which have been capable of giving a lubricant layer only through coating in air because of their poor resistance to high temperatures (200° C. and higher) and their low vapor pressures can be sprayed in a vacuum, since such lubricants can be atomized into minute droplets. It is also possible to apply the lubricant by gravure coating, reverse-roll coating, or die coating in the air as in a conventional technique.

Preferred examples of the perfluoropolyethers include those having a molecular weight of from 2,000 to 5,000. For example, the perfluoropolyethers commercially available under the trade names of "FOMBLIN Z DIAC" (carboxyl-modified; manufactured by Aodimont Co.) and "FOMBLIN Z DOL" (alcohol-modified; manufactured by Aodimont Co.) are usable. These perfluoropolyethers are preferred because they have hydroxyl or carboxyl groups at terminals and hence serve to enhance adhesion between the lubricant and the magnetic layer.

Other usable examples of the lubricant include fluorine-compound lubricants containing a benzene ring, a double bond, a branch, etc. and fatty acid lubricants. Of these, the fluorine-compound lubricants are preferred to fatty acid lubricants because the former lubricants improve corrosion resistance as well as durability.

In spraying the lubricant, it is preferred to use the lubricant as a solution in an appropriate solvent, with the lubricant concentration being about from 0.001 to 10% by weight, desirably from 0.02 to 2.0% by weight. Examples of the solvent include inert fluorine-compound solvents (e.g., perfluorocarbons such as "Fluorinate" manufactured by Sumitomo 3M Ltd., Japan and perfluoropolyethers such as "Garden" manufactured by Aodimont Co.), aromatic hydrocarbon solvents such as toluene, alcohol solvents, and ketone solvents. In the case where a perfluoropolyether is used as the lubricant, a perfluorocarbon can be used as the solvent therefor in such an amount as to result in a lubricant concentration of about from 0.001 to 1.0% by weight, preferably from 0.05 to 0.2% by weight. The spraying amount of the lubricant may be suitably determined according to the use of the magnetic recording medium, the kind of the lubricant, etc. It is however preferred to regulate the lubricant spraying amount so as to give a lubricant layer having a thickness of about from 5 to 200 Å.

A back coat layer may be formed on the support in the magnetic recording medium of the present invention, on the side opposite to the magnetic layer. This back coat layer may be formed by applying a coating fluid prepared by dispersing a carbon black and other ingredient(s) into an appropriate solvent. Alternatively, the back coat layer may be formed by vapor-depositing a metal or a semimetal by a physical vapor deposition (PVD) technique, in particular by the thermal evaporation method or sputtering.

In the case where the back coat layer is formed by coating, a carbon black having a particle diameter of from 10 to 100 nm is dispersed into a binder, e.g., a vinyl chloride or urethane resin or nitrocellulose, and the resulting coating fluid is applied by gravure coating, reverse-roll coating, die coating, or the like at a dry thickness of preferably from 0.4 to 1.0 μm.

In the case where the back coat layer is formed by vapor deposition, aluminum or silicon is preferably used as the metal or semimetal. In this case, the thickness of the back coat layer is preferably from 0.05 to 1.0 μm.

A topcoat layer may be formed on the back coat layer for the purpose of further improving running properties, durability, and other properties.

Preferred embodiments of processes for producing the magnetic recording medium of the present invention are explained below.

For producing the magnetic recording medium of this invention, conventionally known processes can be used without particular limitations. In a preferred process, a continuous vacuum evaporator as shown in FIG. 3 is used which has a means for diagonal vapor deposition. The apparatus shown in FIG. 3 has two film-forming parts, and is capable of forming two vapor-deposited metal films (upper layer and lower layer) through one operation.

In the apparatus, vapor-deposited metal films are formed as follows. Vapor sources 12 and 13 which each is a metal serving as the material of a vapor-deposited metal film are respectively placed in movable crucibles 14 and 15 in a high-vacuum chamber 10 having an internal pressure of from $1\times10^{-4}$ to $1\times10^{-8}$ Torr. The vapor sources 12 and 13 are heated with electron beams 18 and 19 respectively generated by electron guns 16 and 17. By shifting the positions of the crucibles 14 and 15, the degree of column curvature can be changed. As stated hereinabove, the metals respectively used as the vapor sources 12 and 13 may be of the same kind or of different kinds. The metals thermally evaporated from the vapor sources 12 and 13 are deposited on a support 2 during the course of its travel from an unwinding roll 20 to a cooling drum 22. In this apparatus, the metal used as the vapor source 12 gives a lower vapor-deposited metal film, while the metal used as the vapor source 3 gives an upper vapor-deposited metal film. The support 2 having the thus-formed two vapor-deposited metal films is wound on a winding roll 24. Numerals 28, 29, and 30 each denotes a shielding plate for depositing the evaporated metals in desired positions. During vapor deposition, an oxidizing gas, e.g., oxygen gas, is introduced through each of oxidizing gas introducing pipes 26 and 27 to regulate each vapor-deposited metal film so as to be made up of separated colums followed by isolation and minutization to thereby improve coercive force and C/N characteristics.

For enabling each vapor-deposited metal film to have a degree of column curvature of 20% or lower in the above-described operation, use may be made, for example, of a method in which an apparatus such as that shown in FIG. 3 is used in such a manner that the support is kept oblique along straight lines during film deposition, or a method in which a large-diameter can roll is used to enlarge the angle of incidence.

If desired and necessary, after the formation of the magnetic layer, the protective layer and/or the lubricant layer may be formed on the magnetic layer by the method described hereinabove, and the back coat layer may be formed on the support on the side opposite to the magnetic layer by the method described hereinabove.

The magnetic recording medium of the present invention will be explained below in more detail by reference to Examples, but these Examples should not be construed as limiting the scope of the invention in any way.

EXAMPLE 1

Using the continuous vacuum evaporator shown in FIG. 3 (the crucibles 12 and 13 were movable), a magnetic recording medium was produced as follows. In the vacuum chamber 10 having an internal pressure of $1\times10^{-5}$ Torr, a polyethylene terephthalate (hereinafter referred to as "PET") sheet having a thickness of 9.8 µm was unwound from the unwinding roll 20 and caused to run on the cooling drum 22 at a speed of 1 m/min.

Electron beams 18 and 19 were respectively generated by the electron guns 16 and 17 to heat and evaporate vapor sources 12 and 13 which each was Co. The evaporated metal was deposited on the PET sheet. During this vapor deposition, oxygen gas having a purity of 99.998% was introduced through the oxidizing gas introducing pipes 26 and 27 at a rate of 35 SCCM for each pipe. As a result, a magnetic layer composed of two superposed vapor-deposited Co films was formed on the PET sheet. The lower vapor-deposited Co film had a degree of column curvature of 8.5%, an angle of column inclination of 49°, and a thickness of 1,500 Å. The upper vapor-deposited Co film had a degree of column curvature of 5.5%, an angle of column inclination of 55°, and a thickness of 1,000 Å. The magnetic layer thus obtained had a center-line surface roughness $R_a$ of 1.6 nm.

The magnetic layer was subsequently coated with a perfluoropolyether ("FOMBLIN" (trade name), manufactured by Aodimont Co.) to form a lubricant layer having a thickness of 12 Å. Further, a known back coating composition was applied to the PET sheet on the back side thereof at a dry thickness of 0.5 µm and dried to form a back coat layer.

Thereafter, the PET sheet was slit into an 8-mm width to obtain a magnetic tape having a width of 8 mm.

Figure 4:
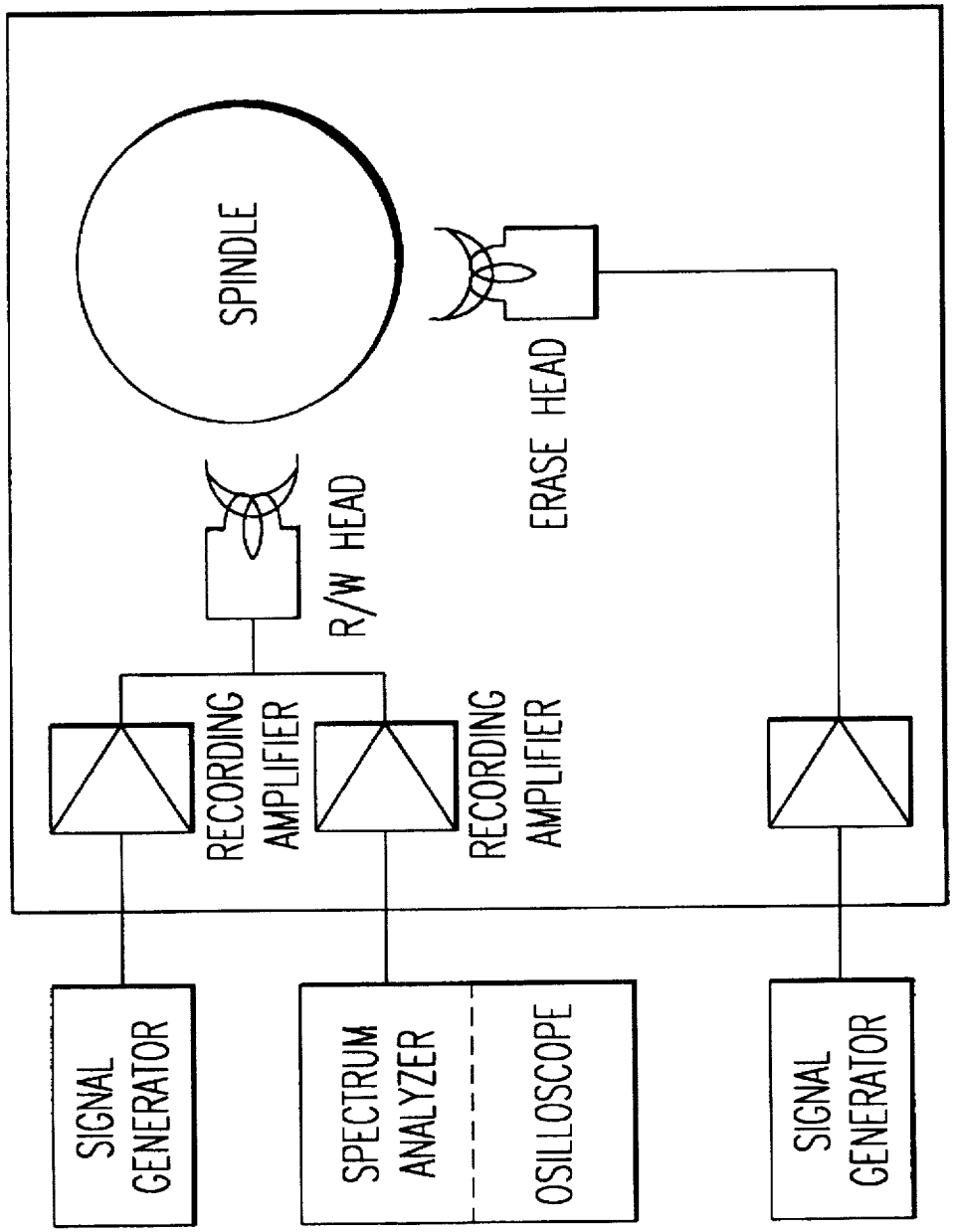
FIG. 4 is a view showing the drum tester method.

The magnetic tape obtained was evaluated by the drum tester method shown in FIG. 4, in which three kinds of signals having frequencies of 5 MHz, 10 MHz, and 20 MHz, respectively, were recorded on the magnetic tape, and the recorded signals were reproduced to determine the output (dB) and C/N (dB) thereof, with the magnetic tape obtained in Comparative Example 1, which will be given later, being used as a reference tape (0 dB). In addition, the longitudinal-direction coercive force and vertical-direction coercive force of the magnetic tape were determined with a VSM (vibrating-sample magnetometer). The results obtained are shown in Table 1.

Details of the head and spectrum analyzer used in the above drum tester method are as follows.

Head

Hi 8 mm VCR/EP head

Truck width:15 µm

Head L value:0.7 µH (10 MHz)

Effective gap length:0.23 µm

Spectrum analyzer RBW:17 kHz (using a digital filter, corresponding to a conventional 30-kHz analog filer)

EXAMPLE 2

A magnetic tape having a magnetic layer composed of two superposed vapor-deposited Co films was obtained in the same manner as in Example 1, except that the positions of the crucibles 12 and 13 shown in FIG. 3 were shifted, and that oxygen gas was introduced through the oxidizing gas introducing pipes 26 and 27 at flow rates of 60 SCCM and 30 SCCM, respectively. The lower vapor-deposited Co film had a degree of column curvature of 19.0%, an angle of column inclination of 53°, and a thickness of 700 Å. The upper vapor-deposited Co film had a degree of column curvature of 3.2%, an angle of column inclination of 58°, and a thickness of 500 Å. The magnetic layer thus obtained had a center-line surface roughness $R_a$ of 1.8 nm.

The magnetic tape thus obtained was evaluated in the same manner as in Example 1. The results obtained are shown in Table 1.

EXAMPLE 3

A magnetic tape having a magnetic layer composed of two superposed vapor-deposited Co films was obtained in the same manner as in Example 1, except that the positions of the crucibles 12 and 13 shown in FIG. 3 were shifted, and that oxygen gas was introduced through the oxidizing gas introducing pipes 26 and 27 at flow rates of 30 SCCM and 25 SCCM, respectively. The lower vapor-deposited Co film had a degree of column curvature of 12.0%, an angle of column inclination of 52°, and a thickness of 1,600 Å. The upper vapor-deposited Co film had a degree of column curvature of 7.0%, an angle of column inclination of 55°, and a thickness of 1,400 Å. The magnetic layer thus obtained had a center-line surface roughness $R_a$ of 1.7 nm.

The magnetic tape thus obtained was evaluated in the same manner as in Example 1. The results obtained are shown in Table 1.

EXAMPLES 4 TO 9

Magnetic tapes having a magnetic layer composed of two superposed vapor-deposited Co films were obtained in the same manner as in Example 1, except that the conditions used in Example 1 were changed as shown in Table 1. In Table 1 are shown the degrees of column curvature, thicknesses, and angles of column inclination of the individual vapor-deposited films in each of the thus-obtained magnetic tapes and the coercive force and center-line surface roughness $R_a$ of the magnetic layer. These magnetic tapes were evaluated in the same manner as in Example 1. The results obtained are shown in Table 1.

EXAMPLE 10

A magnetic tape having a magnetic layer composed of three superposed vapor-deposited Co films (upper, middle, and lower layers) was obtained in the same manner as in Example 1, except that three vapor sources were used in place of the two vapor sources in Example 1, and that the conditions shown in Table 1 were employed. In Table 1 are shown the degrees of column curvature, thicknesses, and angles of column inclination of the individual vapor-deposited films in the thus-obtained magnetic tape and the coercive force and center-line surface roughness $R_a$ of the magnetic layer. This magnetic tape was evaluated in the same manner as in Example 1. The results obtained are shown in Table 1.

COMPARATIVE EXAMPLE 1

A magnetic tape having a magnetic layer consisting of only one vapor-deposited Co film was obtained in the same manner as in Example 1, except that the right-side film-forming part (including the vapor source 12, crucible 14, and electron gun 16) in FIG. 3 was used and the left-side film-forming part was not used, and that oxygen gas was introduced through the oxidizing gas introducing pipe 26 at a flow rate of 52 SCCM. The vapor-deposited Co film had a degree of column curvature of 15%, a center-line surface roughness $R_a$ of 1.6 nm, and a thickness of 2,000 Å.

The magnetic tape thus obtained was evaluated in the same manner as in Example 1. The results obtained are shown in Table 1.

COMPARATIVE EXAMPLE 2

A magnetic tape having a magnetic layer composed of two superposed vapor-deposited Co films was obtained in the same manner as in Example 1, except that the positions of the crucibles 12 and 13 shown in FIG. 3 were shifted, and that oxygen gas was introduced through the oxidizing gas introducing pipes 26 and 27 at flow rates of 35 SCCM and 100 SCCM, respectively. The lower vapor-deposited Co film had a degree of column curvature of 25% and a thickness of 1,000 Å. The upper vapor-deposited Co film had a degree of column curvature of 20% and a thickness of 3,000 Å. The magnetic layer thus obtained had a center-line surface roughness $R_a$ of 1.5 nm.

The magnetic tape thus obtained was evaluated in the same manner as in Example 1. The results obtained are shown in Table 1.

COMPARATIVE EXAMPLES 3 AND 4

Magnetic tapes having a magnetic layer composed of two superposed vapor-deposited Co films were obtained in the same manner as in Example 1, except that the conditions used in Example 1 were changed as shown in Table 1. In Table 1 are shown the degrees of column curvature, thicknesses, and angles of column inclination of the individual vapor-deposited films in each of the thus-obtained magnetic tapes and the coercive force and center-line surface roughness $R_a$ of the magnetic layer. These magnetic tapes were evaluated in the same manner as in Example 1. The results obtained are shown in Table 1.

TABLE 1

| | Degree of column curvature (%) | | | Thickness (Å) | | | Angle of column inclination (deg.) | | | Output (dB) | | |
|---|---|---|---|---|---|---|---|---|---|---|---|---|
| | Upper layer | Middle layer | Lower layer | Upper layer | Middle layer | Lower layer | Upper layer | Middle layer | Lower layer | 5 MHz | 10 MHz | 20 MHz |
| Example | | | | | | | | | | | | |
| 1 | 5.5 | | 8.5 | 1000 | | 1500 | 55 | | 49 | 1.4 | 1.7 | 3.3 |
| 2 | 3.2 | | 19 | 500 | | 700 | 58 | | 53 | 0.1 | 0.6 | 4.5 |
| 3 | 7 | | 12 | 1400 | | 1600 | 55 | | 52 | 2.1 | 1.8 | 1.4 |
| 4 | 15 | | 20 | 500 | | 2000 | 52 | | 46 | 1.0 | 1.4 | 2.5 |
| 5 | 5 | | 10 | 1000 | | 1500 | 60 | | 55 | 1.9 | 2.1 | 4.8 |
| 6 | 6 | | 15 | 800 | | 1200 | 60 | | 55 | 2.2 | 3.2 | 5.1 |
| 7 | 10 | | 20 | 2000 | | 3000 | 57 | | 51 | 2.0 | 3.2 | 3.4 |
| 8 | 5.5 | | 8.5 | 700 | | 1000 | 60 | | 53 | 0.7 | 1.3 | 3.6 |
| 9 | 10 | | 15 | 400 | | 600 | 55 | | 52 | 0.3 | 1.5 | 3.1 |
| 10 | 5 | 10 | 20 | 500 | 1000 | 2000 | 57 | 55 | 54 | 1.1 | 1.9 | 2.6 |

TABLE 1-continued

| Comparative Example | | | | | | | | | | | |
|---|---|---|---|---|---|---|---|---|---|---|---|
| 1 | 15 | | 2000 | | | 55 | | | 0 | 0 | 0 |
| 2 | 20 | 25 | 3000 | | 1000 | 50 | | 50 | −0.9 | −1.4 | −1.8 |
| 3 | 13 | 13 | 950 | | 950 | 55 | | 51 | 0.2 | 0.3 | 0.4 |
| 4 | 20 | 15 | 1000 | | 2000 | 45 | | 50 | −0.3 | −0.4 | −1.0 |

| | C/N (dB) | | | Oxygen amount (SCCM) | | | | Hc | Hc |
|---|---|---|---|---|---|---|---|---|---|
| | 5 MHz | 10 MHz | 20 MHz | Upper layer | Middle layer | Lower layer | Ra (nm) | (Oe) // | Oe ⊥ |
| Example | | | | | | | | | |
| 1 | 1.7 | 2.1 | 4 | 35 | | 35 | 1.6 | 1590 | 1980 |
| 2 | 0.4 | 0.9 | 4.9 | 30 | | 60 | 1.8 | 1990 | 2860 |
| 3 | 1.8 | 1.3 | 1.3 | 25 | | 30 | 1.7 | 1510 | 1720 |
| 4 | 1.2 | 1.4 | 2.9 | 25 | | 40 | 1.6 | 1630 | 1890 |
| 5 | 2.1 | 2.3 | 4.8 | 45 | | 50 | 1.2 | 1720 | 2360 |
| 6 | 2.2 | 3.4 | 5.3 | 60 | | 75 | 1.3 | 1910 | 2470 |
| 7 | 2.0 | 2.7 | 3.1 | 40 | | 45 | 1.6 | 1530 | 1910 |
| 8 | 0.9 | 1.4 | 3.7 | 30 | | 35 | 1.5 | 1620 | 1930 |
| 9 | 0.4 | 1.2 | 2.9 | 25 | | 30 | 1.5 | 1560 | 1890 |
| 10 | 1.3 | 2.1 | 2.5 | 35 | 45 | 50 | 1.6 | 1570 | 1890 |
| Comparative Example | | | | | | | | | |
| 1 | 0 | 0 | 0 | 52 | | | 1.6 | 1600 | 2000 |
| 2 | −1.2 | −1.3 | −1.9 | 100 | | 35 | 1.5 | 1210 | 1590 |
| 3 | 0.1 | 0.2 | 0.3 | 80 | | 30 | 1.7 | 1570 | 1860 |
| 4 | −0.5 | −0.7 | −1.2 | 35 | | 30 | 1.6 | 1530 | 1900 |

As apparent from the results shown in Table 1, the magnetic tapes obtained in Examples 1 to 10 attained a higher output and a higher C/N characteristics throughout a wide frequency range than the magnetic tape obtained in Comparative Example 1, which had only one vapor-deposited metal film.

The results also show that the output characteristics and C/N characteristics of the magnetic tape obtained in Comparative Example 2, which had a vapor-deposited metal film having a degree of column curvature exceeding 20%, decreased with increasing frequency.

The results given in Table 1 furthermore show that the magnetic tape in which the upper vapor-deposited metal film had the same degree of column curvature as the lower vapor-deposited metal film (Comparative Example 3) and the magnetic tape in which the upper vapor-deposited metal film had a higher degree of column curvature than the lower vapor-deposited metal film (Comparative Example 4) also underwent decreases in output characteristics and C/N characteristics with increasing frequency.

As described above in detail, the magnetic recording medium of the present invention has improved output characteristics and improved C/N characteristics and enables high-density recording due to the magnetic layer thereof which is composed of at least two vapor-deposited metal films each regulated so as to have a specific degree of column curvature and a specific thickness.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support and formed thereover a magnetic layer having a multilayer structure comprising at least two vapor-deposited metal films each made up of columns, each vapor-deposited metal film having a degree of column curvature of 20% or lower, and any of said vapor-deposited metal films which is closer to said support having a higher degree of column curvature than any of said vapor-deposited metal films which is closer to the surface, wherein said vapor-deposited metal film closer to said support has a larger thickness than said vapor-deposited metal film closer to the surface, and the vapor-deposited metal film closest to said support has a column curvature of 8–20%.

2. The magnetic recording medium as claimed in claim 1, wherein the degree of column curvature of said vapor-deposited metal film closer to said support is at least two times the degree of column curvature of said vapor-deposited metal film closer to the surface.

3. The magnetic recording medium as claimed in claim 1, wherein said magnetic layer has a longitudinal-direction coercive force of from 1,000 to 2,500 Oe and a vertical-direction coercive force of from 1,500 to 3,000 Oe.

4. The magnetic recording medium as claimed in claim 1, wherein said magnetic layer has a thickness of from 1,000 to 5,000 Å.

5. The magnetic recording medium as claimed in claim 1, wherein the angle of column inclination is from 20° to 80°.

6. The magnetic recording medium as claimed in claim 5, wherein any of said vapor-deposited metal films which is closer to said support has a smaller angle of column inclination than any of said vapor-deposited metal films which is closer to the surface.

7. The magnetic recording medium of claim 1, wherein said medium is a magnetic tape.

8. The magnetic recording medium of claim 1, wherein said multilayer structure comprises three vapor-deposited metal films.

9. The magnetic recording medium of claim 1, wherein said vapor-deposited metal film closer to said support has a column curvature of 8–15%, and said vapor deposited metal film closer to the surface has a column curvature of 5–10%.

10. The magnetic recording medium of claim 1, wherein said vapor-deposited metal film closer to said support has an angle of column inclination of 35°14 60°, and said vapor-deposited metal film closer to the surface has an angle of column inclination of 30°–55°.

11. A method of making the magnetic recording medium of claim 1, comprising:

vapor-depositing a first metal film on said support; and vapor-depositing a second metal film on said support.

12. A method as claimed in claim 11, wherein the degree of column curvature of said vapor-deposited metal film closer to said support is at least two times the degree of column curvature of said vapor-deposited metal film closer to the surface.

13. The method as claimed in claim 11, wherein said magnetic layer has a longitudinal-direction coercive force of from 1,000 to 2,500 Oe and a vertical-direction coercive force of from 1,500 to 3,000 Oe.

14. The method as claimed in claim 11, wherein said magnetic layer has a thickness of from 1,000 to 5,000 Å.

15. The method as claimed in claim 11, wherein the angle of column inclination is from 20° to 80°.

16. The method as claimed in claim 15, wherein any of said vapor-deposited metal films which is closer to said support has a smaller angle of column inclination than any of said vapor-deposited metal films which is closer to the surface.

17. The method of claim 11, wherein said magnetic recording medium is a magnetic tape.

18. The method of claim 11, wherein said multilayer structure comprises three vapor-deposited metal films.

19. The method of claim 11, wherein said vapor-deposited metal film closer to said support has a column curvature of 8–15%, and said vapor-deposited metal film closer to the surface has a column curvature of 5–10%.

20. The method of claim 11, wherein said vapor-deposited metal film closer to said support has an angle of column inclination of 35°–60°, and said vapor-deposited metal film closer to the surface has an angle of column inclination of 30°–55°.

* * * * *